Patented May 11, 1937

2,079,604

UNITED STATES PATENT OFFICE 2,079,604

TREATMENT OF MATERIALS

William Alexander Dickie and Ernest Leslie Greenwood, Spondon, near Derby, England, assignors to Celanese Corporation of America, a corporation of Delaware No Drawing. Application May 28, 1931, Serial No. 540,802. In Great Britain August 3, 1930

1 Claim. (Cl. 41—26)

This invention relates to the treatment of materials and more particularly to the formation of effects on yarns, fabrics, films and like materials made of or containing organic derivatives of cellulose.

In U. S. Patent No. 1,780,645 to Camille Dreyfus and William R. Blume, entitled "Improvements in ornamental fabric and method of making the same", processes for the production of matt effects upon fabrics made of or containing organic derivatives of cellulose are described, wherein the materials are treated with effect compositions containing an effect material and a water insoluble thickening agent which is dissolved in a liquid which has no appreciable solvent action on the organic derivative of cellulose present in the fabric, and preferably but not necessarily containing a plasticizer or softening agent to impart suppleness to the film produced from the effect composition.

It has now been found that not only may increased permanency be imparted to the effects, especially where coloured effect materials are present in the composition, but that lustrous effects may also be obtained if a solvent for the cellulose derivative in the fabric to be treated be present in the effect composition employed.

According to the present invention, therefore, materials made of or containing cellulose acetate or other organic derivatives of cellulose are treated with effect compositions, said compositions containing an effect material, a water insoluble thickening agent in a medium which has no appreciable solvent action on the organic derivative of cellulose present in the material, and a substance which possesses a solvent action for the organic derivative of cellulose in the material.

The material to be treated in accordance with this invention may contain any organic derivatives of cellulose, e. g. cellulose acetate, cellulose formate, cellulose propionate and cellulose butyrate, and ethyl cellulose, methyl cellulose and benzyl cellulose, and may consist of one or more of these organic derivatives of cellulose or may contain any of these organic derivatives of cellulose in admixture with other fibres such as silk, cotton, wool, or reconstituted cellulose (rayon). For example the material treated may be a mixed fabric of cellulose acetate and silk or of cellulose acetate and cotton.

For the production of effects the effect composition employed may contain any suitable effect materials, for instance pigments and mineral effect materials e. g. barium sulphate, zinc oxide, metal powders, fish scales, and/or dyes, particularly dyes which have an affinity for the organic derivatives of cellulose in the material, such for example as the S. R. A. dyes.

Any suitable water insoluble materials may be used as thickeners. Thus for example the thickener may be a cellulose derivative, e. g. cellulose nitrate or a cellulose ether. If cellulose nitrate is employed as an ingredient of the composition for use in producing effects upon a fabric containing cellulose acetate, the medium employed in the effect composition may consist of alcohol and ether, while if cellulose ethers, e. g. ethyl cellulose, are employed as thickening agents in compositions for treating materials containing cellulose acetate or other cellulose derivatives insoluble in benzene or toluene, benzene or toluene may be employed.

The effect composition according to the present invention contains a substance having a solvent action on the cellulose derivative in the material under treatment. This substance may be for example a volatile liquid. Where cellulose acetate is present in the material it may be, for example, acetone or methyl ethyl ketone. Further examples of suitable solvents which may be employed for treating cellulose acetate materials are sulphocyanides, ethyl acetate and trichlorethylene. The proportion of solvent in the effect composition should not be great enough to cause any considerable solution of the cellulose derivative in the material treated.

The effect composition may also contain other ingredients, indeed it is preferable that it should contain a plasticizer. Examples of plasticizers and softening agents which may be employed are camphor, triphenyl phosphate, tricresyl phosphate, dibutyl tartrate, diethyl phthalate, triacetin and xylene mono methyl sulphonamide. One or more of these plasticizers may be present, whilst medium and/or high boiling solvents may also be added to the composition.

The composition, for instance a solution, a dispersion, or paste, may be applied to the material by any suitable means. Thus for example it may be applied locally by printing or spraying through stencils, or to the whole surface of the material by immersion of the material in a bath containing the composition.

The material may be subjected to any desired treatment before or after the application of the effect composition. Thus for example it may be dyed, or delustred, or otherwise treated before application of the effect composition. Differential lustre effects may be obtained on materials by applying locally an effect composition to a delustred material in accordance with the present invention and then subjecting the material to a relustring operation.

The following is an example of a composition which may be employed for stencilling a fabric containing an organic derivative of cellulose in accordance with this invention, but it should be understood that this example is given by way of illustration only and is in no way limitative.

A dry dyestuff, for example 1-amino-4-oxy-anthraquinone, is carefully ground and incorporated in the following solution to the extent of 1 to 2%, insoluble particles being removed by any suitable means, such for example, as by straining or settling.

Solution

| | | |
|---|---|---|
| Nitrocellulose | gm | 100 |
| Camphor | gm | 40–50 |
| Xylene mono methyl sulphonamide (mono oil) | cc | 200 |
| Acetone and/or methyl ethyl ketone | cc | 300 |
| Methylated spirit | cc | 1300 |
| Propyl or butyl acetate | cc | 1800 |

The use of propyl acetate as a diluent appears to prevent undue precipitation of the dyestuff and solidification or gel formation in the solution. To apply the above composition locally it may, for example, be sprayed through a stencil on to a fabric consisting of cellulose acetate.

What we claim and desire to secure by Letters Patent is:—

Process for the production of effects on textile materials containing cellulose acetate, which comprises applying to the materials a composition consisting of an effect material and a water-insoluble thickening agent in a medium consisting of the following constituents in approximately the following proportions:

| | | |
|---|---|---|
| Camphor | grams | 40 to 50 |
| Xylene monomethyl sulfonamide | cc | 200 |
| Acetone | cc | 300 |
| Denatured alcohol | cc | 1300 |
| Butyl acetate | cc | 1800 |

WILLIAM ALEXANDER DICKIE.
ERNEST LESLIE GREENWOOD.